United States Patent [19]

Hultsch

[11] Patent Number: 4,536,288

[45] Date of Patent: Aug. 20, 1985

[54] POCKET CENTRIFUGE AND METHOD OF OPERATING SAME

[75] Inventor: Günther Hultsch, Oberschleissheim, Fed. Rep. of Germany

[73] Assignee: Krauss-Maffei AG, Munich, Fed. Rep. of Germany

[21] Appl. No.: 628,325

[22] Filed: Jul. 6, 1984

Related U.S. Application Data

[62] Division of Ser. No. 126,359, Mar. 3, 1980, abandoned.

[30] Foreign Application Priority Data

Mar. 5, 1979 [DE] Fed. Rep. of Germany ....... 2908455

[51] Int. Cl.$^3$ ............................................ B01D 33/02

[52] U.S. Cl. .................................... 210/325; 210/370; 210/385

[58] Field of Search .................. 127/19; 210/325, 326, 210/328, 344, 367–371, 380.1, 385, 781

[56] References Cited

U.S. PATENT DOCUMENTS 1,040,373 10/1912 Michelsen .......................... 210/325
1,123,536 1/1915 Howard .............................. 210/325
1,655,774 1/1928 Sansaricq ........................... 210/325
1,794,792 3/1931 Munson ............................... 210/325
2,546,427 3/1951 Bullen ........................... 210/325 X
2,796,990 6/1957 Peck ................................... 210/370
3,056,504 10/1962 Lavallee ............................ 210/328
3,402,821 9/1968 Peck ................................... 210/325
3,451,550 6/1969 Cox ................................ 210/370 X
3,627,138 12/1971 Peck ................................... 210/325
3,738,490 6/1973 Tigerman ....................... 210/368 X
4,103,432 8/1978 Dieterich et al. ............... 210/368 X
4,118,248 10/1978 Lacher ................................ 127/19

FOREIGN PATENT DOCUMENTS 941478 4/1956 Fed. Rep. of Germany .
1119775 12/1961 Fed. Rep. of Germany .
1183444 12/1964 Fed. Rep. of Germany .
1288990 2/1969 Fed. Rep. of Germany .
1757316 4/1971 Fed. Rep. of Germany .

*Primary Examiner*—Robert H. Spitzer
*Attorney, Agent, or Firm*—Karl F. Ross; Herbert Dubno

[57] ABSTRACT

A pocket centrifuge has a plurality of sieve pockets having sieve surfaces and orbitable about an axis with the sieve surfaces forming sieve angles with perpendiculars to planes including this axis. A filtrant is fed radially to these pockets so that solids collect on the surfaces thereof and a filtrate passes through the surfaces. These solids have a friction angle measured to a perpendicular to the centrifugal force acting on them which is dependent on the magnitude of this force and their coefficient of friction. The angular orbiting speed of the pocket is periodically varied between one speed at which the respective friction angle of the solids is smaller than the sieve angle and the solids slide on the sieve surface and another angle at which the respective friction angle of the solids is greater than the sieve angle and the solids sit on the sieve surface. This variation in angular orbiting speed can be obtained by periodically braking or accelerating the rotor carrying the pocket, or by mounting this rotor for rotation about two axes for continuous acceleration and deceleration of the pockets. Alternately the sieve angles can be changed by pivoting the pockets on the rotor to achieve the same effect.

5 Claims, 5 Drawing Figures

POCKET CENTRIFUGE AND METHOD OF OPERATING SAME

This application is a division of application Ser. No. 126,359 filed Mar. 3, 1980, now abandoned.

FIELD OF THE INVENTION

The present invention relates to a pocket centrifuge and a method of operating it. More particularly this invention concerns such a pocket centrifuge used for the continuous separation of a filtrant, such as sugar-beet pulp, into solids and a filtrate.

BACKGROUND OF THE INVENTION

For the continuous separation of a filtrant such as sugar-beet pulp into solids and a liquid filtrate a pocket centrifuge is frequently used. Such an arrangement has a rotor that carries a plurality of so-called sieve pockets, each having a sieve surface that faces generally forwardly and inwardly relative to the rotation direction and an axis of the rotor. A chamber formed behind each of these sieve pockets is provided with a drain through which the filtrate can be withdrawn. The sieve surface forms at any point on its surface a respective sieve angle relative to a perpendicular to a plane including the rotation axis.

The solids resting on the sieve surface have a friction angle which is a function of the type of solids, the type of surface they are resting on, and the force pressing the solids against the sieve surface. This friction angle is normally measured to a perpendicular to the force acting on the solids. When the surface supporting the solids is inclined at an angle greater than the friction angle relative to this force the solids will slide along it. When the surface is at a smaller angle the solids will stand without moving on the surface.

In a centrifuge the force is the centrifugal force which presses the solids radially outwardly. This centrifugal force obviously can be resolved into a force vector normal to the surface and one parallel to the surface. The type of surface and the type of solids establish the coefficient of friction, both static and sliding, that together with the magnitude of the force establish the friction angle. As the force increases the friction angle increases, assuming the coefficient of friction remains the same.

Accordingly it is a standard practice to operate the pocket centrifuge at such a rate that the friction angle is slightly less than the sieve angle, so that the solids will move radially outwardly on the sieve pockets. Since the filtrant is normally charged onto the sieve pockets at the radial inner and leading edges thereof, relative to the axis in the rotation direction of the rotor, this means that the solids will slowly slide in a layer radially outwardly along the sieve surface. During such radial outward displacement the liquid in these solids is, of course, driven through the sieve surfaces where it can be recovered separately. At the outer edges of the pocket the solids are typically cast radially off into a solids collection area.

It is known, as for example from German patent document No. 1,119,775 filed Sept. 8, 1959 by H. PINKOW, to mount the various pockets on the rotor so that they can be pivoted on respective pocket axes. Thus it is possible in the system to alter the sieve angle, even during operation of the centrifuge. This publication describes that such adjustment is carried out to optimize the centrifuge operation so as to achieve a steady-state output. Another such centrifuge is described in German patent publication No. 1,183,444 filed Mar. 21, 1961 by J. von Rotel and M. von Rotel.

So-called wobble centrifuges are also known which have a single normally conical perforated drum that is simultaneously rotated about a central axis and caused to wobble about this axis. The rotation separates the filtrate and solids centrifugally, and the wobbling causes the solid to migrate along the drum surface. Rotation speeds, both for simple rotation and wobbling, however, remain constant during the entire operation of the machine. What is more only a relatively small throughput is possible with such a machine compared to the large throughput of a pocket centrifuge. Such wobble centrifuges can be seen in German patent document No. 941,478 of S. Kiesskalt and F. Kleinlein, No. 1,288,990 filed July 27, 1965 by G. Hultsch and No. 1,757,316 filed Apr. 25, 1968 by G. Grimwood.

OBJECTS OF THE INVENTION

It is an object of the present invention to provide an improved pocket centrifuge and method of operating same.

Another object is to provide a method whereby the residence time of the solids on the individual sieve surfaces of a pocket centrifuge can be substantially increased, while still operating in a continuous manner.

A further object is to provide a pocket centrifuge and operation method which is relatively simple.

SUMMARY OF THE INVENTION

These objects are attained according to the instant invention in a pocket centrifuge as described above, but wherein the angular orbiting speed of the pocket is periodically varied between a low speed at which the respective friction angles of the solids are smaller than the sieve angle and the solids slide on the sieve surface, and a relatively high speed at which the respective friction angles are greater than the sieve angle and the solids sit without moving on the sieve surface. Alternately the sieve angle is periodically varied while the friction angle remains the same to achieve the same effect.

The sieve surfaces of a pocket centrifuge normally are curved concavely forwardly, with the radial inner edge trailing the radial outer edge in the rotation direction. This curvature is provided so that the sieve angle decreases going away from the axis, inversely as the centrifugal force increases. Since the friction angle of the solids is inversely related to the centrigual force which, as mentioned aobve, increases away from the axis, the system according to the instant invention therefore ensures that the friction angle and the sieve angle at any location on the sieve surface will maintain a given ratio with respect to each other at any given angular speed. Thus when the speed is varied so that the repose angle of the solids all along the sieve surface becomes smaller than the sieve angle the solids will slide on the sieve surface along the full length of this surface.

Another factor influencing the operation according to the instant invention is the difference between sliding friction and static friction. Once the solids have started to move static friction is no longer effective and the sliding friction of the solids relative to each other and to the sieve surface becomes the predominant factor. Normally the coeffcient of sliding friction for a given solid is substantially lower than its coefficient of static friction. Thus if, for instance, the rotation rate is slowed down so that the friction angle decreases, an angular velocity will be reached at which the solids will start to slide. When speeding up, however, this particular speed will have to be substantially overshot before the solids stop sliding.

In fact, according to the instant invention it has been found substantially more convenient to set the solids into periodic sliding simply by momentarily braking the rotor of the centrifuge. Such rapid deceleration causes a momentary substantial decrease in the friction angle of the solids, setting them into motion so that the static friction no longer becomes relevant but, instead, the sliding friction does. Thereafter as the rotor accelerates back to speed the solids slide until the equilibrium point is passed and they again stop.

Thus, with the system of the instant invention it is possible for the residence time of the solids on the pockets to be made very long. Rather than painstakingly calculating a steady-state operation where the solids slowly migrate along the pockets, it becomes a relatively simple matter to advance the solids pulsewise along the pocket, choosing any residence time which produces solids of sufficient dryness.

Thus it is possible according to the instant invention to operate the system by mounting the rotor itself on another rotor so that the rotor axis itself orbits about another parallel axis. The net velocity of this type of double-axis system ensures that the pockets will be continuously accelerated and decelerated, at speeds chosen to cause the friction angles to constantly cross over the sieve angles so that, once again, the material on the sieve surfaces will advance step-fashion on the medium.

SPECIFIC DESCRIPTION

Figure 1:
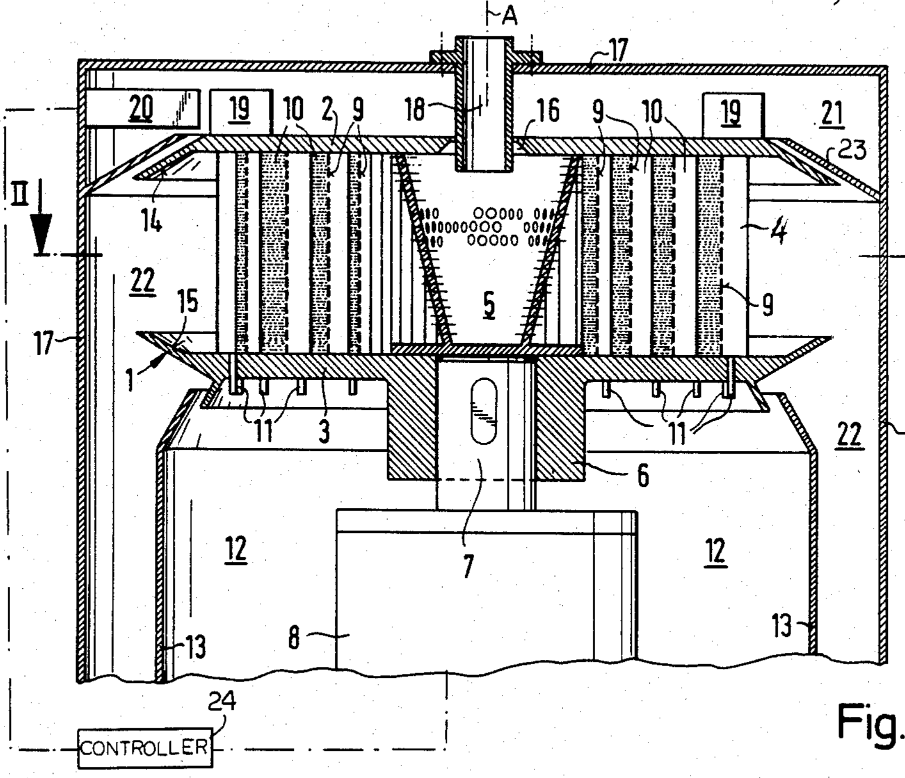
FIG. 1 is a vertical section through a pocket centrifuge according to the instant invention.
Figure 2:
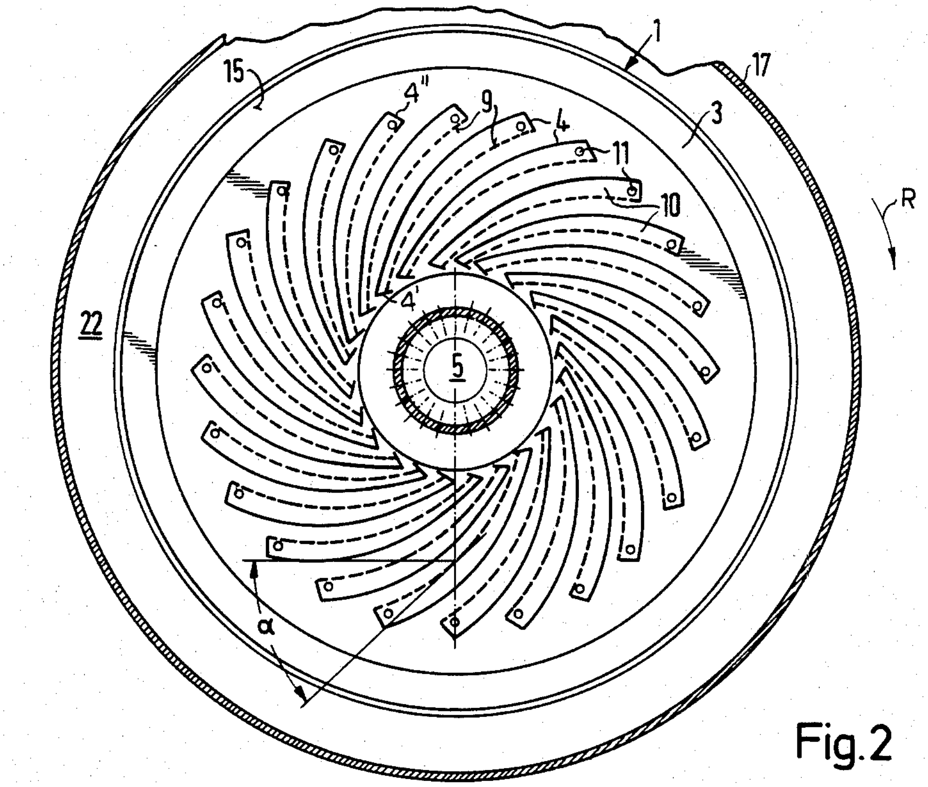
FIG. 2 is a horizontal section taken along line II—II of FIG. 1.

As seen in FIGS. 1 and 2 a centrifuge according to the instant invention has a rotor 1 rotatable about an upright axis A and having an upper rotor plate 2 above and parallel to a lower rotor plate 3. Sieve pockets 4 extend axially between the upper and lower plates 2 and 3, having inner edges 4' and outer edges 4", and being curved arcuately forwardly in a manner well known per se relative to the normal rotation direction R of the rotor 1. An upwardly flared and axially centered frustoconical perforated inlet plate 5 is also braced between the lower plate 3 and upper plate 2. The lower plate 3 is itself unitarily formed with a hub 6 carried on a shaft 7 of an electric drive motor 8.

Each of the pockets 4 has a screen-type filter medium 9 forming its front sieve surface and defining a filtrate-collecting chamber 10 from which filtrate can be drained via respective drains 11 that open below the lower plate 3 into a collection chamber 12 having a wall 13.

The upper plate 2 has a downwardly flaring outer edge 14 and the lower plate 3 has a complementary upwardly flaring outer edge 15. The upper plate 2 has a central hole 16 through which extends a filtrant feed tube 18 secured to the housing 17 of the centrifuge. A partition 23 subdivides the interior of this housing 17 into an upper compartment 21 housing permanent magnets 19 carried on the upper plate 2 and electromagnets 20 fixed on the housing 17. Below this partition 23 a chamber 22 is formed in which solids collect in a manner also known per se.

Under normal operating circumstances the motor 8 drives the rotor 1 continuously at a preselected speed. A suspension to be filtered is fed in through the tube 18 so that it is projected radially outwardly by the perforated inlet frustocone 5 onto the surfaces 9 of the pockets 4. A prior-art filter would simply be run at such a low speed that the sieve angle as shown at $\alpha$ in FIG. 2 is slightly greater than the normal friction angle of the solids, so that these solids will migrate radially outwardly and forwardly in the rotation direction R until they fall off the outer edges 4" of the pockets 4.

According to the instant invention the machine is operated at a different and normally higher speed than has hitherto been used so that the friction angle of the solids, which is a function of centrifugal force acting on them and which is therefore largely dependent on angular speed and radial distance from the axis A, normally is substantially greater than the sieve angle $\alpha$ at any location along the surface 9. Obviously the sieve angle $\alpha$ decreases going out from the axis A, but the centrifugal force increases inversely so that the ratio of the friction angle and sieve angle at any location will be the same along the entire surface of the given pocket 4 for a particular speed. According to this invention the electromagnets 20 are energized from a controller 24 so as to periodically decelerate the rotor 1 by temporarily de-energizing the motor, which deceleration can easily be elastically accommodated by the drive train and motor 8. This action substantially decreases the friction angles of the solids so that they will momentarily substantially undershoot the sieve angle. The result will be outward shifting of the solids.

Thus with the system according to the instant invention the machine is normally operated at a speed that is too great to radially displace the solids on the sieve surfaces 9. Periodically the rotation rate is altered in such a manner as to increase the friction angle of the solids so that they will shift. This could, of course, also be done simply by slowing down the rotor momentarily, thereby applying any other type of mechanical, pneumatic, or other braking to the rotor 1. The essence is merely to act on the rotation speed in such a manner that the friction angles of the solids change and periodically go from a condition when they are less than the respective sieve angle to one where they are substantially more.

Of course, the difference between the coefficient of sliding friction and the coefficient of static friction for the solids becomes somewhat important and complicates this operation. With the prior-art systems wherein a steady-state advance of the solids radially outwardly on the pockets was intentionally created, only the sliding friction needed to be accounted for once the centrifuge was operated. According to the instant invention it is necessary to vary the friction angle considerably to overcome the static friction and start the solids moving, whereupon the coefficient of sliding friction becomes the relevant factor.

Figure 3:
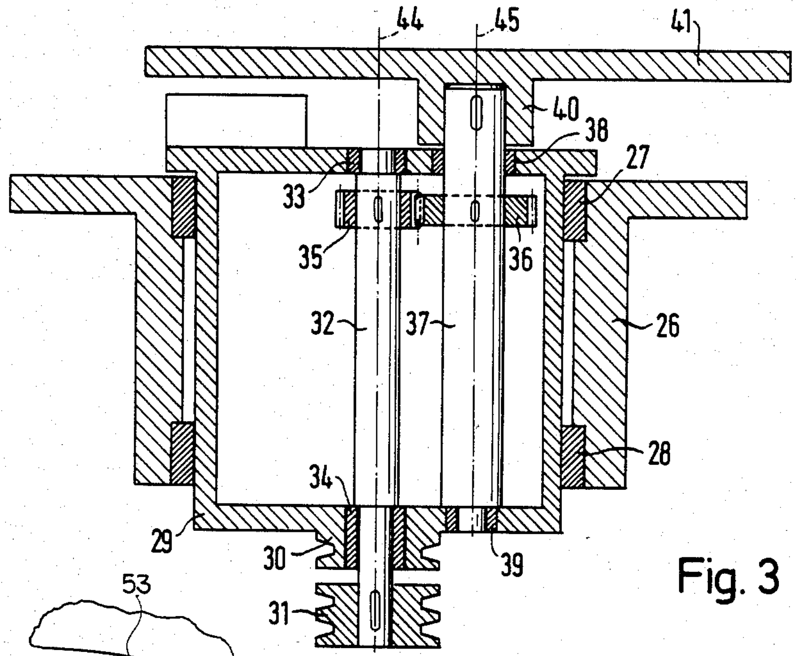
FIG. 3 is a vertical section through a detail of another centrifuge according to this invention.
Figure 4:
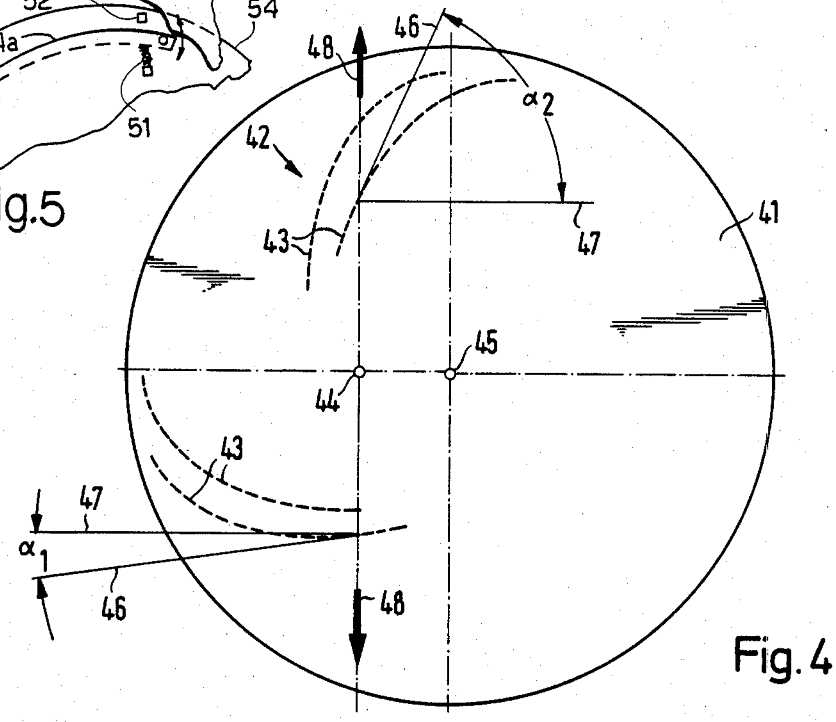
FIG. 4 is a largely schematic top view illustrating operation of the arrangement of FIG. 3.

It is also possible to employ a system such as that shown in FIGS. 3 and 4. Here a fixed housing 26 has upper and lower bearings 27 and 28 carrying a tubular shaft 29 provided with a V-belt pulley 30 for rotation of it about an axis 44. A shaft 32 is mounted in bearings 33 and 34 in the tubular shaft 29 for rotation about the axis 44 and has a respective double V-belt pulley 31 for rotation about this axis 44 independently of rotation of the tube shaft 29. This shaft 32 carries a gear 35 that meshes with a gear 36 carried on another shaft 37 journaled in bearings 38 and 39 in the top and bottom ends of the shaft 29 offset from the axis 44. This shaft 37 is centered on an axis 45 parallel to but offset from the axis 44. The upper end of the shaft 37 is fitted to a hub 40 of a bottom plate 41 functionally identical to the plate 3 of FIG. 1.

Thus with the system of FIGS. 3 and 4 a pocket such as indicated schematically at 42 in FIG. 4 is orbited about two axes 44 and 45. The axis 45 rotates about the axis 44 at a speed which is controlled independently of the rotation speed of the tube shaft 29 about the axis 44, so that the pockets 42 will continuously increase and decrease in speed, and in effect the centrifugal force will vary considerably.

These pockets 42 have curved surfaces 43 which are subjected to a centrifugal force that is dependent on the rotation about the axes 44 and 45. Normally the rotation speed about the axis 44 is high and the rotation speed about the axis 45 is low. What determines whether a solid particle on the surface 43 slides is the angle between the tangent 46 from the surface 43 and a perpendicular 47 to the centrifugal-force direction 48. As a result of the eccentric arrangement and the simultaneous rotation about the two axes this angle changes continuously between a minimum $\alpha_1$ and a maximum $\alpha_2$.

So long as the difference between these two angles $\alpha_1$ and $\alpha_2$ is great the point at which the material will be caused to slide will be continuously crossed in both directions. As a result there will once again be continuous but pulse-type advance of solids on the surfaces of 43. Between advances, however, material will stand absolutely still so that adequate centrifuging can be ensured.

Figure 5:
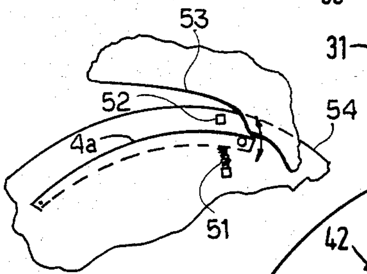
FIG. 5 is a detail view of another arrangement according to this invention.

FIG. 5 shows a pocket 4*a* pivoted at 50 at its inner edge and normally urged by a spring 51 against a stop 52. The pocket 4*a* is engaged radially by a cam having an outer cam surface 53 and an inner cam surface 54. When riding on the inner surface 54 the pocket 4*a* is out of contact with the stop 52 and its sieve angles are considerably smaller than when it contacts the outer surface 53. Thus the cam 53,54 periodically, that is at least once for each rotor revolution, changes the sieve angle. In this system therefore the friction angle can remain the same, which is effected by using a constant rotation speed.

I claim:

1. A pocket centrifuge for receiving a suspension and extracting a filtrate therefrom, comprising:

a rotor body formed with a plurality of sieve pockets distributed around an axis and adapted to receive said suspension means;

means for rotating said body about said axis to extract a filtrate from said suspension whereby sieve angles are formed between perforated surfaces of said pockets and solids retained on said surfaces which are less than the friction angle of said solids on said surfaces, said pockets being elongated and having innermost and outermost edges delimiting said surfaces;

means defining an eccentric axis for said body offset from the first-mentioned axis and located inwardly of the innermost edges of said pockets; and means for orbiting said first-mentioned axis about said eccentric axis while continuing to rotate said body about said first-mentioned axis to cyclically increase the sieve angle of said solids on said surfaces to a magnitude greater than said friction angle whereby said solids are cast off from said surfaces only upon the orbiting of said first-mentioned axis about said offset axis and only from the radially outermost edges of said pockets.

2. The pocket centrifuge defined in claim 1, further comprising means for feeding said suspension radially to said pocket.

3. The pocket centrifuge defined in claim 2 wherein said body is a disk fixed to a first shaft defining said first-mentioned axis and journaled in a cylindrical member rotatable in a housing of said centrifuge about said offset axis, a second shaft being journaled in said member along said offset axis and said shafts being provided with meshing gears for operatively connecting them together, said member and said shaft being provided with means for connecting same to respective independently operable drives.

4. The pocket centrifuge defined in claim 1 further comprising an electromagnetic brake connected to said body and operable at slow rotation of the same.

5. The pocket centrifuge defined in claim 4 wherein said pockets are curved inwardly and forwardly relative to a normal rotation direction of said rotor.

* * * * *